United States Patent [19]

Saishi et al.

[11] Patent Number: 5,500,812
[45] Date of Patent: Mar. 19, 1996

[54] MULTIPLICATION CIRCUIT HAVING ROUNDING FUNCTION

[75] Inventors: Mana Saishi, Fukuoka; Takayuki Minemaru, Osaka, both of Japan

[73] Assignee: Matsushita Electric Industrial Co., Ltd., Osaka, Japan

[21] Appl. No.: 258,991

[22] Filed: Jun. 13, 1994

[30] Foreign Application Priority Data

Jun. 14, 1993 [JP] Japan ..................... 5-141727

[51] Int. Cl.⁶ ................................... G06F 7/52
[52] U.S. Cl. ................................... 364/745
[58] Field of Search ........................ 364/745, 757, 364/760

[56] References Cited

U.S. PATENT DOCUMENTS

| | | | |
|---|---|---|---|
| 4,507,749 | 3/1985 | Ohhashi | 364/757 |
| 5,150,319 | 9/1992 | Zyner | 364/745 |
| 5,212,662 | 5/1993 | Cocanougher et al. | 364/745 |
| 5,245,564 | 9/1993 | Quek et al. | 364/745 |
| 5,258,943 | 11/1993 | Gamez et al. | 364/745 |
| 5,317,530 | 5/1994 | Toriumi | 364/745 |
| 5,341,319 | 8/1994 | Madden et al. | 364/745 |

FOREIGN PATENT DOCUMENTS 62-120535   6/1987   Japan.
1-53228     3/1989   Japan.

*Primary Examiner*—David H. Malzahn
*Attorney, Agent, or Firm*—Willian Brinks Hofer Gilson & Lione

[57] ABSTRACT

A product P is calculated by multiplying a multiplicand X and a multiplier factor Y which are 16-bit fixed-point numbers and binary numbers in two's complement notation. Thus obtained product P is 31-bit length and the most significant bit thereof is a sign bit. Further, the product P is rounded down or rounded off to obtain a 16-bit rounded result PR. At this time, the 15-bit rounding data R to be added to the product P is changed according to the sign of the product P which is predicted so as to obtain respective rounded results which have the same absolute value from the two products which have different signs from each other and the same absolute value. In detail, in a case of rounding-down, "0000" and "TFFF" (both in hexadecimal numeral) are respectively generated as the rounding data when the product P is positive and when the product P is negative. In a case of rounding-off, "4000" and "3FFF" (both in hexadecimal numeral) are respectively generated as the rounding data R when the product P is positive and when the product P is negative. The rounding data is added to the less significant 15 bits of the thus calculated product P and the less significant 15 bits of the thus added result are deleted to make the remaining 16 bits the rounded product PR.

6 Claims, 7 Drawing Sheets

MULTIPLICATION CIRCUIT HAVING ROUNDING FUNCTION

BACKGROUND OF THE INVENTION

This invention relates to a multiplication circuit having a rounding function which is used for digital signal processing such as image data processing.

MPEG2 (Moving Pictures Expert Group Phase 2)is well known as a standard type in the art of image data compression. In the image data processing, product-sum operation, i.e., plural multiplications and accumulative addition of the multiplied results thereof often appear. Rounding-down and rounding-off are keys to rounding processing of the products in MPEG2.

The rounding process in a conventional multiplication circuit is explained. A product P is obtained by multiplication of a multiplicand X and a multiplier factor Y. Suppose, for example, that the multiplicand X and the multiplier factor Y are 16-bit fixed-point numbers and are binary numbers in two's complement notation. Namely, each most significant bit of the multiplicand X and the multiplier factor Y is a sign bit. The product P in 31-bit length is obtained at the multiplication circuit. The most significant bit of the product P is a sign bit and is determined according to the sign bits of the multiplicand X and the multiplier factor Y.

In a case where the product P is rounded down so as to obtain a 16-bit rounded result PR as well as the multiplicand X and the multiplier factor Y, the less significant 15 bits of the product P are deleted with no condition, irrespective of the sign of the product P, and the remaining 16 bits are used as the rounded result PR.

As well, in a case where the product P is rounded off so as to obtain a 16-bit rounded result PR, 1 is added to the 15th bit, counting from the least significant bit, of the 31-bit product P, the less significant 15 bits of the thus added result are deleted and the remaining 16 bits are used as the rounded result PR.

Suppose that the radix point is positioned between the 15th bit and 16th bit, counting from the least significant bit, of the 31-bit product P, the processes of the above rounding-down and rounding-off are respectively expressed as FIGS. 6 and 7. Wherein, the decimal numeral is applied to FIGS. 6 and 7.

In the case of rounding-down, as shown in FIG. 6, +0.5 is rounded to 0 to thus decrease an absolute value and −0.5 is rounded to −1 to thus increase the absolute value. In other words, a change direction of the absolute value in associated with the rounding of the product P is different according to the sign of the product P. This is inconvenient for image data processing which executes accumulative addition of the rounded results of the products, because eccentric accumulation of the rounding error lowers image quality.

In the case of rounding-off, as shown in FIG. 7, +0.5 is rounded to 1 to thus increase the absolute value and −0.5 is rounded to 0 to thus decrease the absolute value, which lowers the image quality, also.

SUMMARY OF THE INVENTION

The present invention has its object of providing a multiplication circuit in which the change direction of an absolute value in association with product rounding is not made different according to the sign of a product.

To attain the above object, in the present invention, rounding data to be added to a product is changed according to the sign of the product so as to obtain rounded results having the same absolute value from two products having the different signs from each other and the same absolute value. For example, in the case of rounding-down, rounding data is generated so that +0.5 and −0.5 are both rounded to 0. In the case of rounding-off, rounding data is generated so that +0.5 and −0.5 are respectively rounded to 1 and −1. As a result, eccentric accumulation of rounding errors in the case of accumulative addition of the rounded results of products is prevented.

Further, in a case where the multiplication circuit comprises a partial product generation circuit for generating a plurality of partial products and a partial product addition circuit for adding the thus generated plural partial products, the operation time and circuit size is reduced by executing the addition of the rounding data in the partial product addition circuit.

BRIEF DESCRIPTION OF THE ACCOMPANYING DRAWINGS

DETAILED DESCRIPTION OF THE INVENTION

Figure 1:
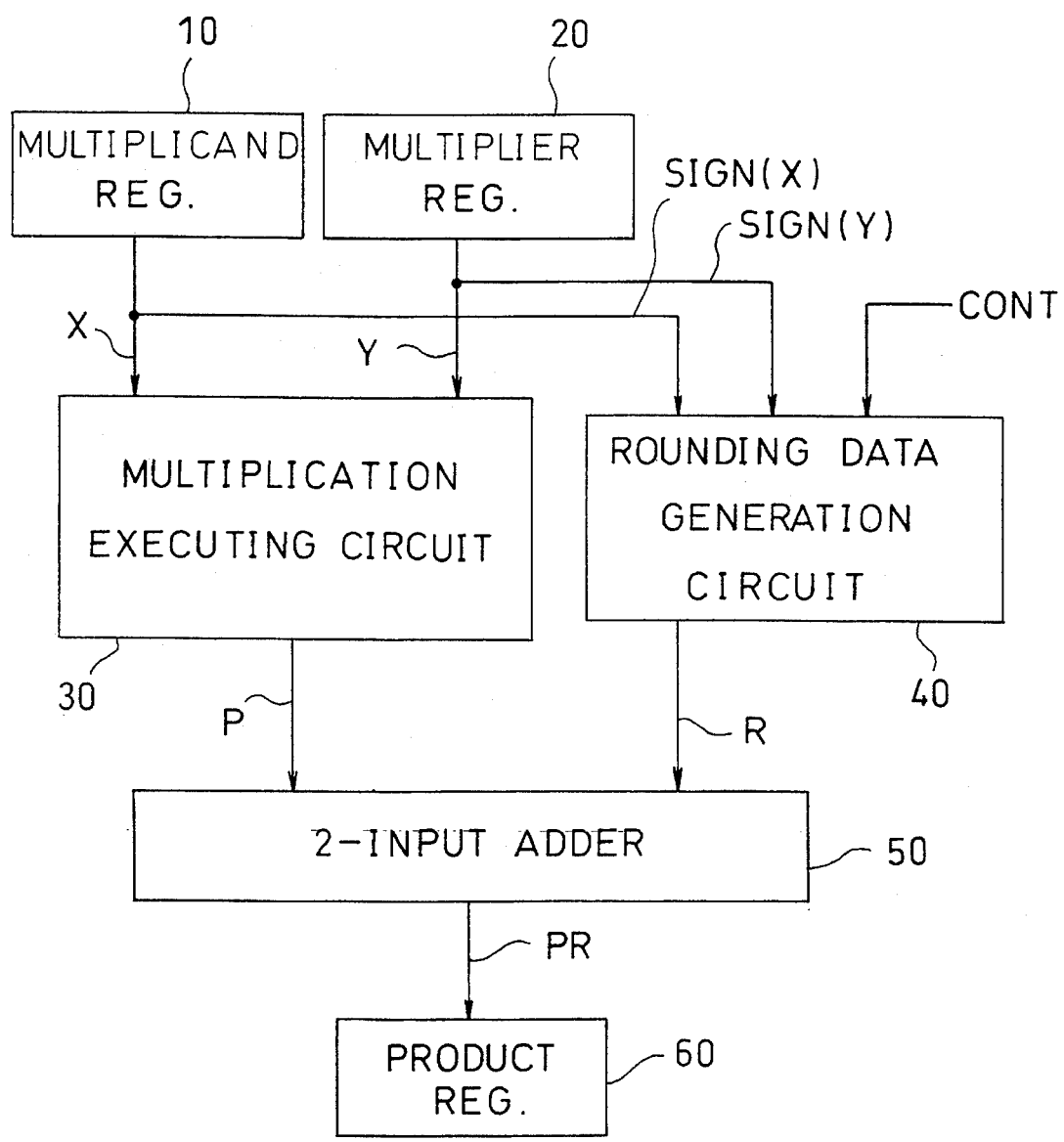
FIG. 1 is a block diagram showing a construction of a multiplication circuit according to a first embodiment of the present invention.

FIG. 1 is a block diagram showing a construction of a multiplication circuit according to the first embodiment of the present invention. The multiplication circuit obtains a product P by multiplying a multiplicand X and a multiplier factor Y, then rounds down or rounds off the thus obtained product P so as to obtain a rounded result PR. The multiplicand X, the multiplier factor Y and the rounded result PR are 16-bit fixed-point numbers and are binary numbers in two's complement notation.

16-bit data respectively retained in a multiplicand register 10 and a multiplier register 20 are input to a multiplication executing circuit 30 as the multiplicand X and the multiplier factor Y respectively, then the product P of 31-bit length is output from the multiplication executing circuit 30. The most significant bit of the product P is a sign bit which is determined according to the sign bits of the multiplicand X and the multiplier factor Y.

On the other hand, the sign bit SIGN(X) of the multiplicand X and the sign bit SIGN(Y) of the multiplier factor Y are input to a rounding data generation circuit 40 in order to predict the sign of the product P. A rounding control signal CONT for specifying whether the product P is to be rounded down or rounded off is further input to the rounding data generation circuit 40. Rounding-down is specified when CONT=0 and rounding-off is specified when CONT=1. The rounding data generation circuit 40 outputs, in accordance with a rule indicated in Table 1, a 15-bit rounding data R corresponding to the sign bits SIGN(X), SIGN(Y) and the rounding control signal CONT. Wherein hexadecimal numeral is applied to Table 1 for expressing the rounding data R.

TABLE 1

| SIGN (X) | SIGN (Y) | CONT | R |
|---|---|---|---|
| 0 | 0 | 0 | 0000 |
| 0 | 1 | 0 | 7FFF |
| 1 | 0 | 0 | 7FFF |
| 1 | 1 | 0 | 0000 |
| 0 | 0 | 1 | 4000 |
| 0 | 1 | 1 | 3FFF |
| 1 | 0 | 1 | 3FFF |
| 1 | 1 | 1 | 4000 |

The product P and the rounding data R are input to a 2-input adder 50. The 2-input adder adds the rounding data R to the less significant 15 bits of the product P then deletes the less significant 15 bits of the thus added result to output the remaining 16 bits as the rounded result PR. The rounded result PR is stored in a product register 60.

The rounding data generation circuit 40 judges the sign of the product P according to a combination of the signs SIGN(X), SIGN(Y) without wait for calculation of the product P by the multiplication executing circuit 30. In detail, the product P is positive when both the signs SIGN(X), SIGN(Y) are 1 or 0 and is negative with the other cases.

In the case where CONT=0, namely in the case of rounding-down, to the less significant 15 bits of the product P in the 2-input adder 50, "0000" (in hexadecimal numeral) is added when the product P is positive and "7FFF" (in hexadecimal numeral) is added when the product P is negative.

In the case where CONT=1, namely in the case of rounding-off, to the less significant 15 bits of the product P in the 2-input adder 50, "4000" (in hexadecimal numeral) is added when the product P is positive and "3FFF" (in hexadecimal numeral) is added when the product P is negative.

Figure 2:
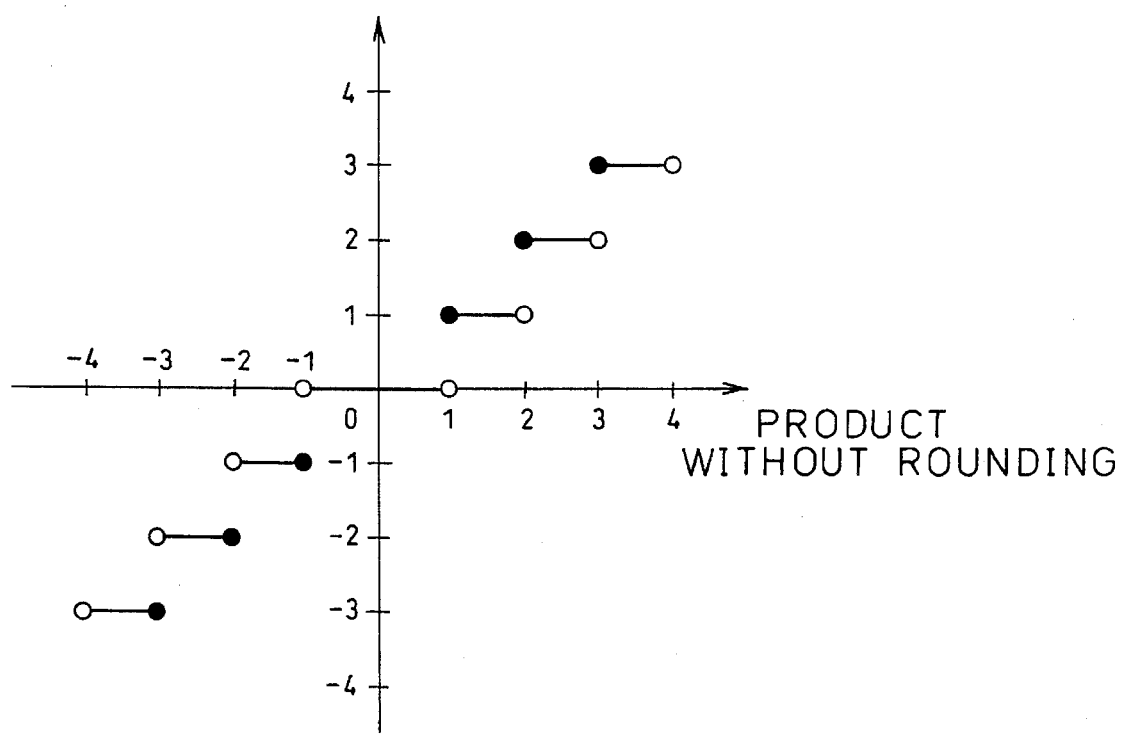
FIG. 2 is a graph showing a rounding-down process of products by the multiplication circuit in FIG. 1.
Figure 3:
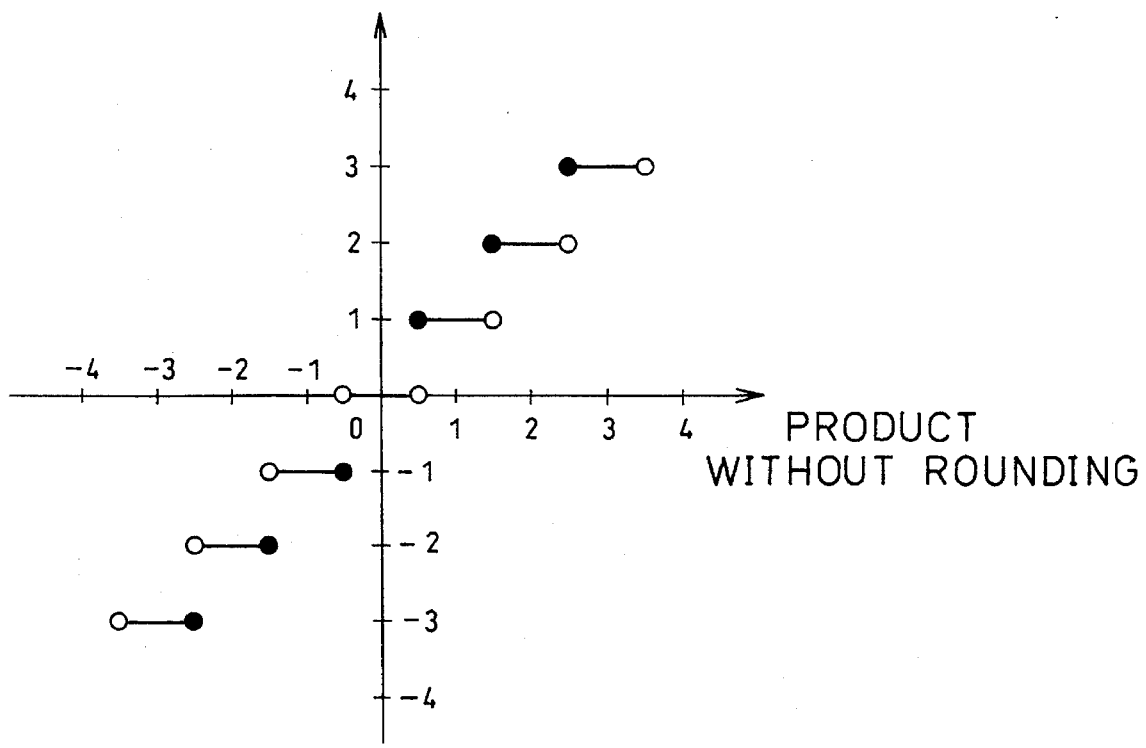
FIG. 3 is a graph showing a rounding-off process of products by the multiplication circuit in FIG. 1.

Suppose that the radix point is positioned between the 15th bit and the 16th bit, counting from the least significant bit, of the 31-bit product P, the processes of rounding-down and rounding-off of the product P in this embodiment are respectively expressed in FIGS. 2 and 3. Wherein, the decimal numeral is applied to FIGS. 2 and 3.

In the case of rounding-down, as shown in FIG. 2, +0.5 is rounded to 0 to decrease the absolute value and −0.5 is rounded to 0 to decrease the absolute value. In the case of rounding-off, as shown in FIG. 3, +0.5 is rounded to 1 to increase the absolute value and −0.5 is rounded to −1 to increase the absolute value. According to this embodiment, the rounded results having the same absolute value are obtained from the two products each of which has a different sign from each other and the same absolute value in both cases of rounding-down and rounding-off. As a result, in, for example, an image data processing, eccentric accumulation of the rounding errors caused by accumulative addition of the rounded results of the products is prevented.

Figure 4:
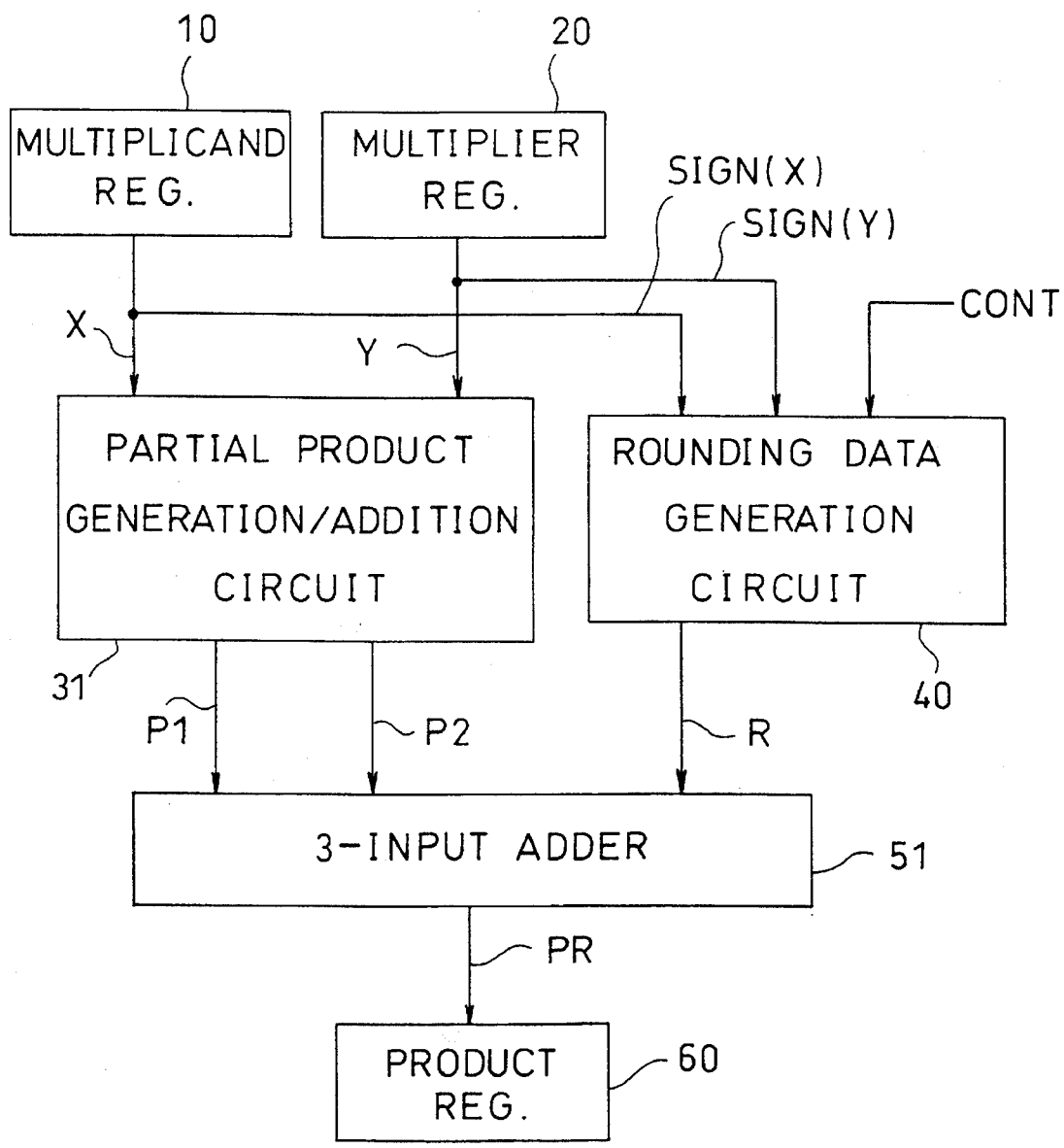
FIG. 4 is a block diagram showing a construction of a multiplication circuit according to a second embodiment of the present invention.

FIG. 4 is a block diagram showing a construction of a multiplication circuit according to the second embodiment of the present invention. In this multiplication circuit, the multiplication executing circuit 30 in FIG. 1 is replaced by a partial product generation/addition circuit 31 in array system for executing a parallel multiplication. The partial product generation/addition circuit 31 generates a plurality of partial products of the multiplicand X and the multiplier factor Y, and executes high-speed addition of the partial products with Wallace tree until the partial products become two intermediate products P1, P2. Reference numeral 51 denotes a 3-input adder for adding the intermediate products P1, P2 and the rounding data R. The other elements in FIG. 4 are respectively identical with those in FIG. 1, thus omitting the description thereof.

Figure 5:
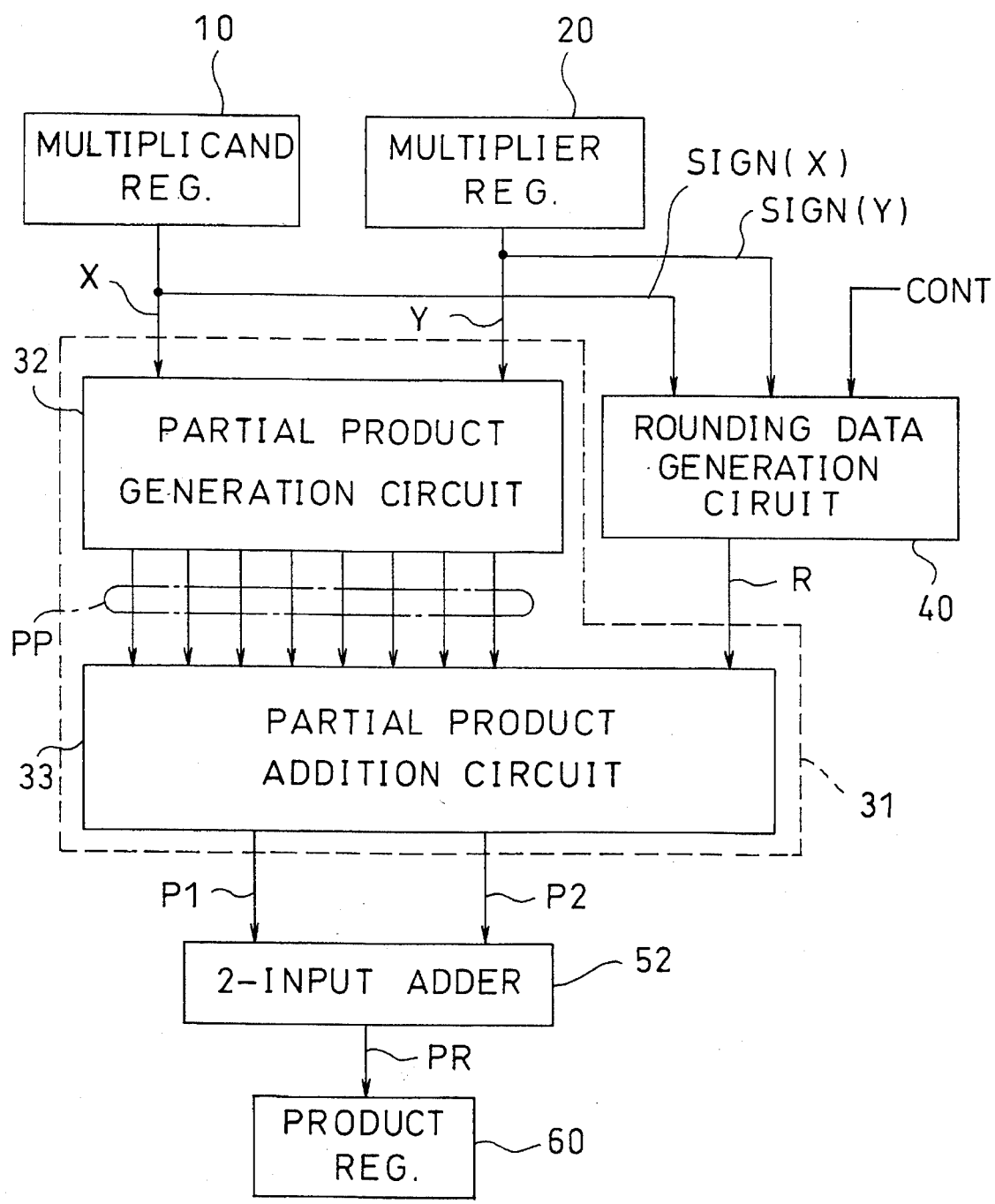
FIG. 5 is a block diagram showing a construction of a multiplication circuit according to a third embodiment of the present invention.
Figure 6:
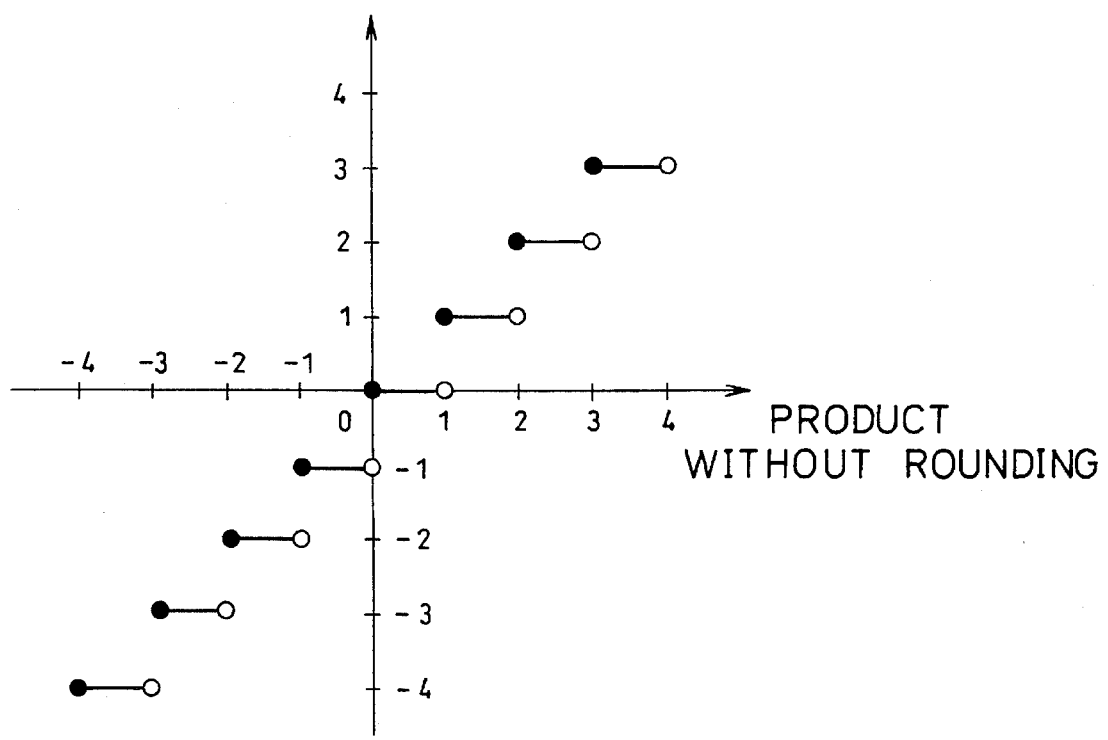
FIG. 6 is a graph showing a rounding-down process of products by a conventional multiplication circuit.
Figure 7:
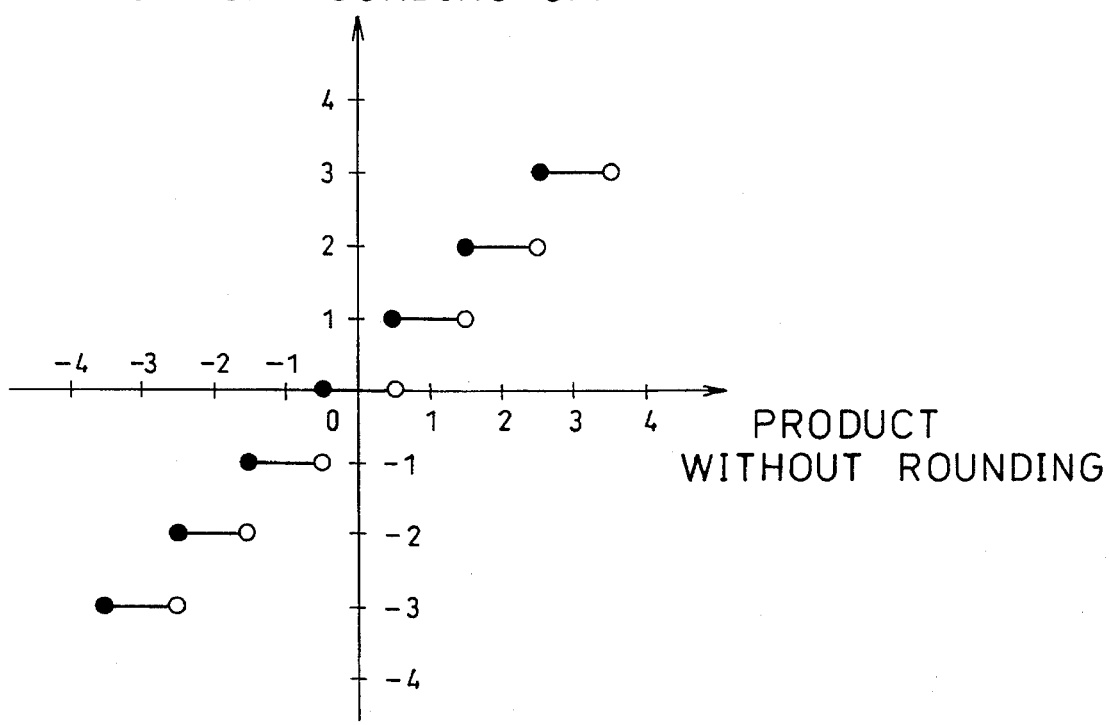
FIG. 7 is a graph showing a rounding-off process of products by the conventional multiplication circuit.

FIG. 5 is a block diagram showing a multiplication circuit according to the third embodiment of the present invention. This multiplication circuit executes the addition of the rounding data R during the addition process of the partial products.

In FIG. 5, the partial product generation/addition circuit 31 includes a partial product generation circuit 32 for generating eight partial products PP from the 16-bit multiplicand X and the 16-bit multiplier factor Y and a partial product addition circuit 33 for executing high-speed addition of the thus generated eight partial products PP with Wallace tree. The 16-bit multiplier factor Y is input to a Booth decoder in the partial product generation circuit 32 to be decoded to a 8-digit multiplier data in accordance to 2-bit Booth algorithm. In the partial product generation circuit 32, the eight partial products PP are generated from the 16-bit multiplicand X and the eight-digit multiplier data. The partial product addition circuit 33 has a function of executing the addition of the eight partial products PP until the partial products PP become two intermediate products P1, P2. Further, the partial product addition circuit 33 has a function of adding the rounding data R during the addition process of the eight partial products PP. Reference numeral 52 denotes a 2-input adder for adding the two intermediate products P1, P2 output from the partial product addition circuit 33. The other elements in FIG. 5 are respectively identical with those in FIG. 4, thus omitting the description thereof.

According to the construction in FIG. 5, the 3-input adder 51 in FIG. 4 is replaced by the 2-input adder 52, which reduces the operation time and circuit size.

Wherein, in a case where only one of rounding-down and rounding-off is to be executed, the rounding data R is determined according to only the signs SIGN(X), SIGN(Y). A tree of carry save adders may be applied to the addition of the partial products, instead of Wallace tree.

We claim:

1. A multiplication circuit for calculating a product comprising:

multiplication means for calculating at least one intermediate product from a multiplicand and a multiplier factor;

rounding data generation means for generating a rounding data corresponding to a sign of the product to be calculated based on the multiplicand and the multiplier factor; and addition means for adding the thus generated rounding data to the thus calculated at least one intermediate product.

2. The multiplication circuit of claim 1, wherein the rounding data generated by said rounding data generation means predicts a sign of the product to be calculated based on a sign of the multiplicand and a sign of the multiplier factor.

3. The multiplication circuit of claim 1, wherein said rounding data generation means has a function of generating a rounding data according to a rounding control signal specifying whether rounding-down or rounding-off is to be executed.

4. A multiplication circuit for calculating a product comprising:

partial product generation means for generating a plurality of partial products from a multiplicand and a multiplier factor;

rounding data generation means for generating a rounding data corresponding to a sign of the product to be calculated based on the multiplicand and the multiplier factor; and partial product addition means for adding the thus generated plurality of partial products, wherein said partial product addition means has a function of adding the thus generated rounding data during the addition process of the plurality of partial products.

5. The multiplication circuit of claim 4, wherein the rounding data generated by said rounding data generation means predicts a sign of the product to be calculated based on a sign of the multiplicand and a sign of the multiplier factor.

6. The multiplication circuit of claim 4, wherein said rounding data generation means has a function of generating a rounding data according to a rounding control signal specifying whether rounding-down or rounding-off is to be executed.

* * * * *